United States Patent [19]

Voll

[11] 4,232,286
[45] Nov. 4, 1980

[54] APPARATUS TO INDICATE THE SPACING BETWEEN A VEHICLE AND A METAL ARTICLE

[76] Inventor: Walter Voll, Industriestrasse 40, 8728 Hassfurt, Fed. Rep. of Germany

[21] Appl. No.: 906,803

[22] Filed: May 17, 1978

[30] Foreign Application Priority Data

May 18, 1977 [DE] Fed. Rep. of Germany ....... 2722498

[51] Int. Cl.³ .......................... G08G 1/16; G01N 27/82
[52] U.S. Cl. ......................................... 340/51; 340/32; 340/38 L; 324/237; 180/271
[58] Field of Search ....................... 340/51, 61, 32, 33, 340/38 L; 180/98, 271; 324/237

[56] References Cited

U.S. PATENT DOCUMENTS

| | | | |
|---|---|---|---|
| 3,355,707 | 11/1967 | Koerner | 340/38 L |
| 3,366,925 | 1/1968 | Aubert et al. | 340/32 |
| 3,437,988 | 4/1969 | Vachon et al. | 340/51 |
| 3,685,013 | 8/1972 | Brickner | 340/38 L |
| 3,688,186 | 8/1972 | Judd | 324/237 |
| 3,732,536 | 5/1973 | Larka et al. | 340/33 |
| 3,775,742 | 11/1973 | Koerner et al. | 340/38 L |
| 4,015,232 | 3/1977 | Sindle | 340/32 |

*Primary Examiner*—John W. Caldwell, Sr.
*Assistant Examiner*—Donnie L. Crosland
*Attorney, Agent, or Firm*—Sughrue, Rothwell, Mion, Zinn and Macpeak

[57] ABSTRACT

Apparatus mounted on a vehicle is arranged to provide a signal indicative of the spacing between the vehicle and a metal article being less than a predetermined amount, the predetermined amount being small compared with the length of the vehicle. The apparatus in combination with the vehicle comprises a plurality of sensor units mounted externally of the vehicle and each comprising a coil, the sensor units being arranged electrically in parallel to each other. A respective oscillator circuit is coupled to each coil to generate a respective electromagnetic field, and to provide an output signal in response to any disturbance of a respective one of the electromagnetic fields as a result of the spacing between the vehicle and the metal article being less than the predetermined amount. Regulating circuits are each arranged to receive the output signal provided by a respective oscillator circuit and to compensate the disturbance of the electromagnetic field after a predetermined delay in response to the output signal. Evaluating circuits are each arranged to receive the output signal provided by a respective oscillator circuit. A spacing indicating circuit is mounted internally of the vehicle. A single connector electrically connects the parallel arrangement of the sensor units to the indicating circuit, the evaluating circuits being arranged in response to the output signal to cause an electrical signal to be applied to the connector.

14 Claims, 8 Drawing Figures

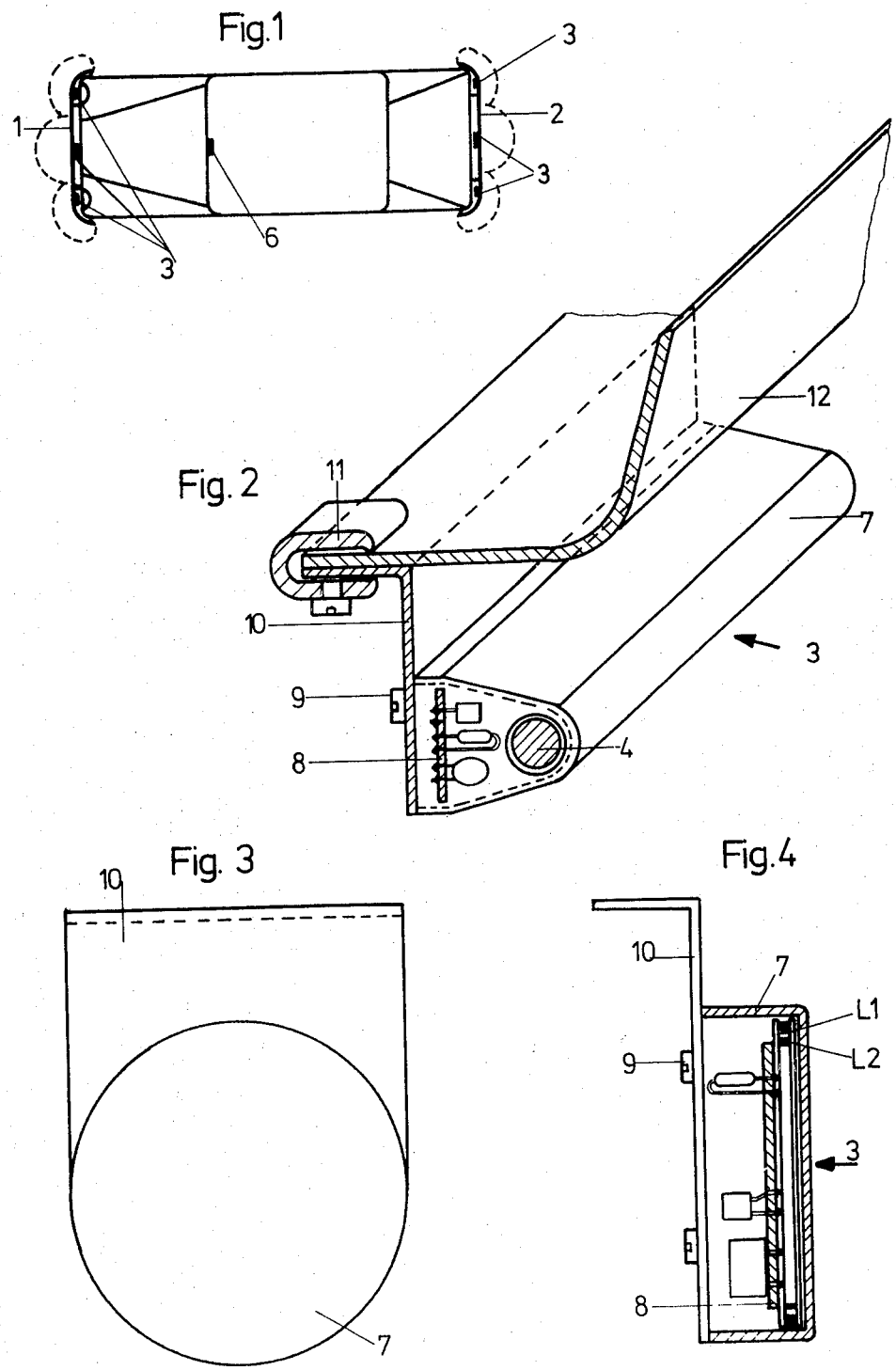

APPARATUS TO INDICATE THE SPACING BETWEEN A VEHICLE AND A METAL ARTICLE

BACKGROUND OF THE INVENTION

The present invention relates to an apparatus mounted on a vehicle and arranged to provide a signal indicative of the spacing between the vehicle and a metal article being less than a predetermined amount, the predetermined amount being small compared with the length of the vehicle.

A circuit is known which operates with a capacitive measurement value pick-up which must be adjusted by means of check capacitance. An adjustment of this kind is awkward and dependent on numerous factors.

U.S. Pat. No. 3,688,186 describes an equipment for the location of faults in metal pieces, which operates with a delayed regulating circuit. This circuit is not suitable as a parking aid for motor vehicles.

SUMMARY OF THE INVENTION

According to the present invention there is provided an apparatus mounted on a vehicle and arranged to provide a signal indicative of the spacing between the vehicle and a metal article being less than a predetermined amount, said predetermined amount being small compared with the length of the vehicle, the apparatus in combination with said vehicle comprising at least one sensor unit mounted to a respective end portion of at least one fender of said vehicle, said sensor units being arranged in parallel with each other and each comprising:

(a) a coil;

(b) oscillator circuit means coupled to said coil and arranged in combination with said coil to generate a respective stray electromagnetic field, and to provide an output signal in response to any disturbance of said electromagnetic field as a result of the spacing between said vehicle and said metal article being less than said predetermined amount;

(c) regulating circuit means arranged to receive said output signal and to compensate the disturbance of the said electromagnetic field after a predetermined delay in response to said output signal; and (d) evaluating circuit means arranged to receive said output signal provided by said oscillator circuit means; said apparatus further comprising spacing indicating circuit means mounted internally of the vehicle, and a single conductor line and earth return means electrically connecting said parallel arrangement of said sensor units to the indicating circuit means, the evaluating circuit means of each said sensor unit being arranged in response to the respective output signal to cause a change in current in said single conductor line.

Several sensor units may be arranged forwardly and rearwardly on the motor vehicle. Preferably, the oscillator circuit which generates a magnetic field may enclose the coil which may project beyond the motor vehicle. As soon as a metal article comes into the stray field, this is disturbed and the disturbance is conducted through a feedback winding arranged in the oscillator circuit to an evaluating circuit which passes the disturbance on to the indicating unit. Thereafter, the disturbance is compensated or regulated out automatically. A following indication takes place on a subsequent relative motion between motor vehicle and metal article.

Advantageously, a parking aid provided by an apparatus embodying the invention may be produced cheaply and may be mounted to the most diverse types of motor vehicles or also trailers without difficult adjustment operations.

The distortions of the stray field, which are brought about by metal parts of the motor vehicle, to which the sensor unit is mounted, are compensated from the start by the regulating circuit.

Preferably, the stray field coil, in a given case with ferrite rod, oscillator circuit, evaluating circuit and regulating circuit may be housed in each sensor unit. Thus, long lines, liable to electrical interference, to the indicating unit are not necessary. The output signal of the evaluating circuit, which is conducted to the indicating unit may be of low frequency, and in practice is not influenced by high-frequency disturbances.

The sensor units may be connected with the indicating unit through a single feed and signal line.

BRIEF DESCRIPTION OF THE DRAWINGS

Embodiments of the present invention will now be more particularly described, by way of example, with reference to the accompanying drawings, in which:

FIG. 1 shows a motor vehicle, schematically in plan view;

FIG. 2 shows a sensor unit with ferrite rod, opened at the side and mounted to a fender bar of the motor vehicle;

FIGS. 3 and 4 show a sensor unit with air-cored coil;

DESCRIPTION OF THE PREFERRED EMBODIMENTS

Figure 5:
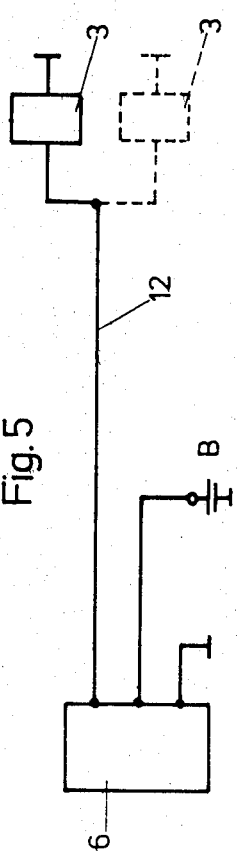
FIG. 5 shows the electrical connection of a sensor unit and an indicating unit arranged in the interior of the vehicle.

Referring now to the drawings, FIG. 1 shows three sensor units 3 mounted on each of the fender bars 1 and 2 of a motor vehicle. A ferrite rod 4, (FIG. 2) which is surrounded by a magnetic field generated by an oscillator circuit 5, (FIG. 7) extends in each of the sensor units approximately perpendicularly to the direction of travel of the motor vehicle. The fields extend beyond the fender bars 1 and 2 in the order of magnitude of about 30 centimeters as illustrated by dashed lines in FIG. 1. An indicating unit 6, is arranged in the driver compartment of the motor vehicle, for example at the dashboard.

With reference to FIGS. 2, 3 and 4, the sensor unit 3 displays a non-metallic housing 7, which is closed at all sides and in which are arranged the ferrite rod 4 and the components of an electronic circuit on a conductor plate 8. The housing 7 is fastened to a metallic angle piece 10, for example by means of two screws 9. The angle piece 10 holds the sensor unit 3 at a predetermined spacing from the fender bars 1 and 2. This spacing is so dimensioned that the fender bar does not damp the field so strongly that the regulating range of the sensor unit is exceeded. In practice, a spacing of a few centimeters suffices. The angle piece 10 extends over the entire length of the housing. It thus produces an initial damping of the field, which must be compensated during the adjustment of the sensor unit through an appropriate setting of its circuit. The influence of the fender bar or of the chassis of the vehicle on the field is thus taken into consideration largely during the production of the sensor unit.

One pole of the electronic circuit is connected with the angle piece 10. The angle piece is fastened by at least one screw clamp 11 to the rim of the fender bar 1 and 2. The length of the housing 7 amounts to about 10 centimeters; its height and width being of the order of magnitude of 2 to 3 centimeters. The sensor unit is thus simply mounted on fender bars subsequently.

In cases in which the sensor unit is to be mounted right from the start to a metallic fender bar, the latter can display apertures, preferably below the usually provided rubber strip. The sensor unit is arranged behind the apertures through which the magentic field can issue.

FIGS. 3 and 4 show a sensor unit, the housing 7 whereof is cylindrically constructed. In this embodiment, the sensor unit operates not with a ferrite rod, but with air-cored coil means L1 and L2, the diameter of which determines the diameter of the housing 7. It has proved that a diameter of the order of magnitude of 6 centimeters is sufficient. A field range of about 30 centimeters is attained thereby. When such a sensor unit is mounted at the rim of the fender bar, the range of the field in the axial direction as compared to that at the circumference is greater by about a factor of 3. The sensor unit in that case responds only at a shorter spacing on lateral approaches.

The sensor unit 3 or the sensor units, as the case may be, is connected with the indicating unit 6 through a single-wire line 12 (FIG. 5) to thereby provide on the one hand, a connection to a battery B of the motor vehicle and, on the other hand, to enable supply of the output signal to the indicating unit 6.

Figure 6:
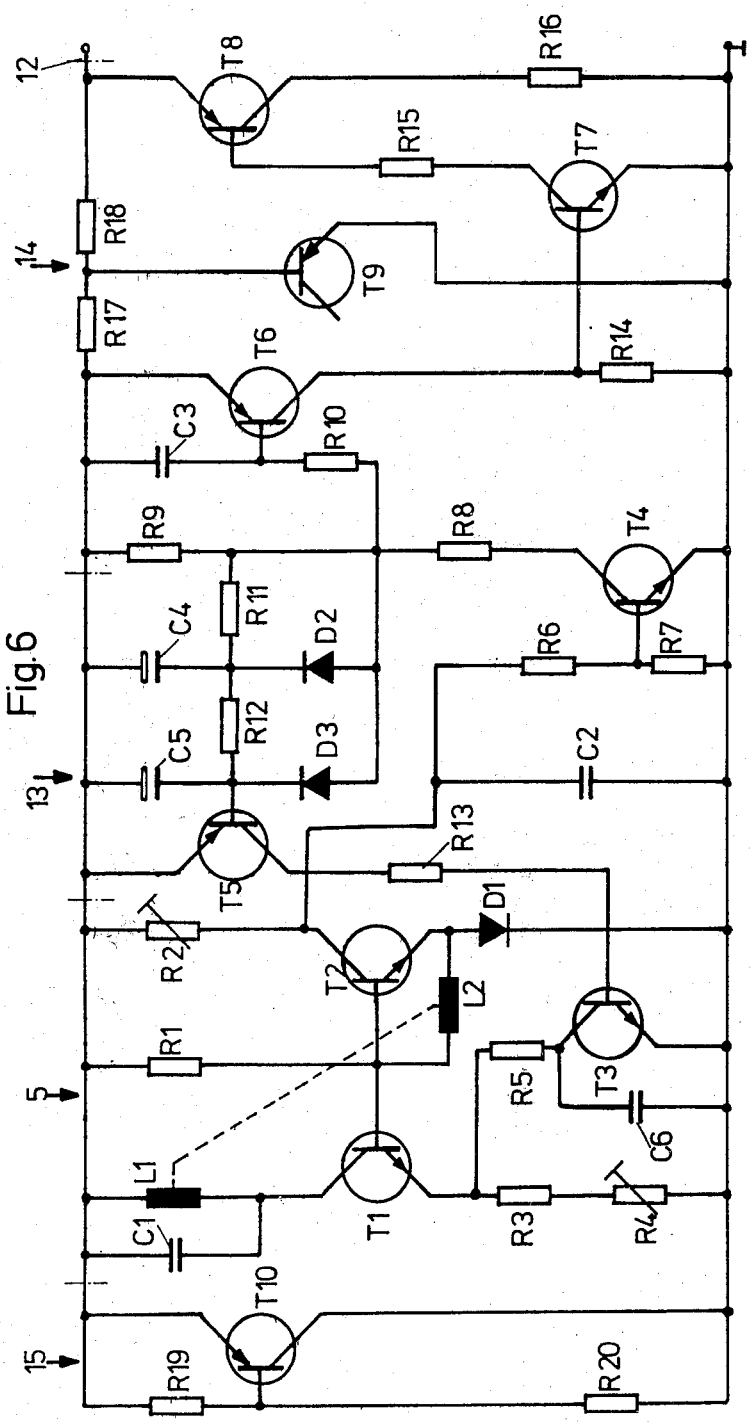
FIG. 6 shows the circuit arrangement of a sensor unit.
Figure 7:
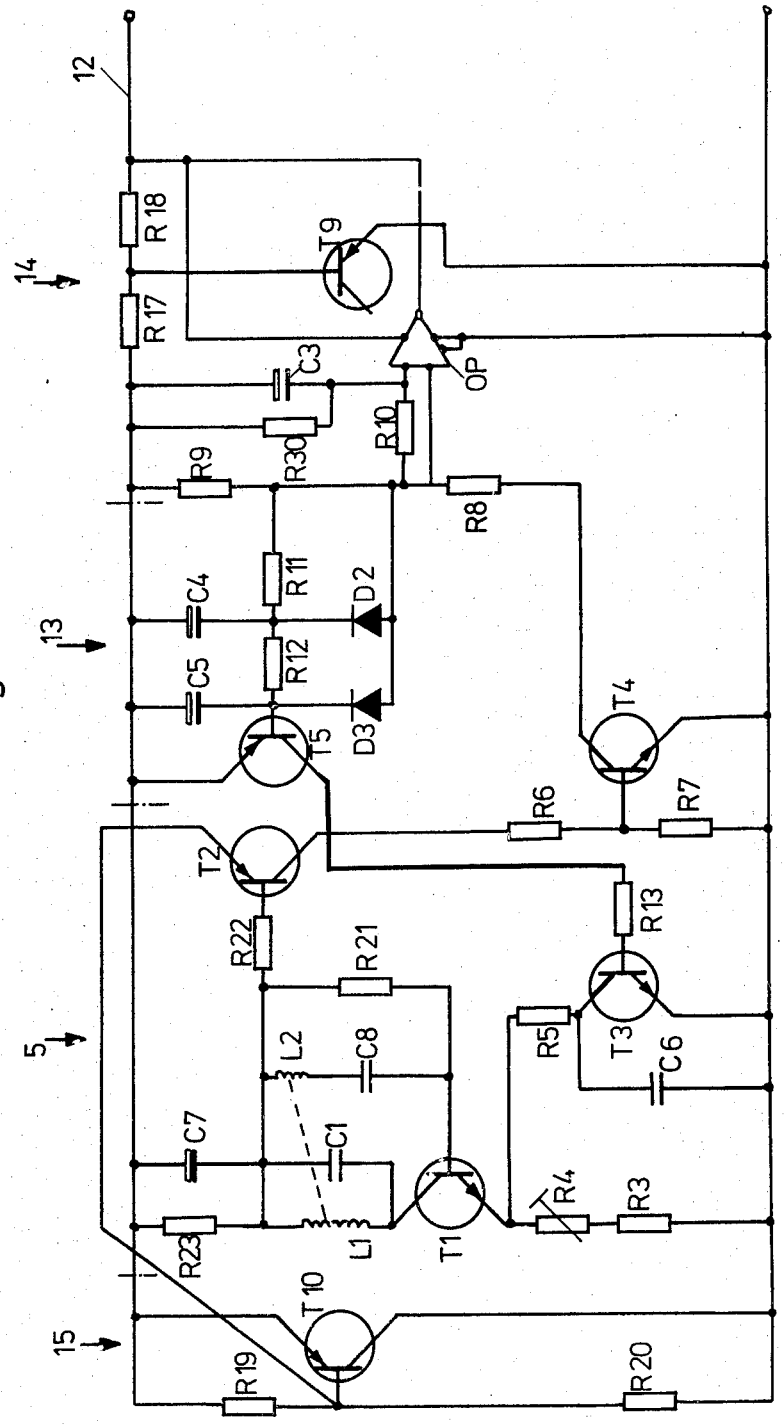
FIG. 7 shows the circuit arrangement of a further embodiment of a sensor unit according to the invention.

The electronic circuit of the sensor unit 3 may be constructed according to either FIG. 6 or FIG. 7. The circuit of the sensor unit 3 is provided with an oscillator circuit 5, a regulating circuit 13 and an evaluating circuit 14, as well as a circuit 15 for voltage stabilization. The circuits are connected between the line 12 and the ground pole of the motor vehicle.

The oscillator circuit 5 according to FIG. 6 operates with a resonant loop consisting of a capacitor C1 and an oscillator winding L1, which is mounted on an ferrite rod or constructed as an air-cored coil. The oscillation is maintained by a transistor T1. The oscillator winding L1 is coupled with a feedback winding L2 which is arranged parallel to the base-emitter path of a second transistor T2. The base of the transistor T1 and the base of the transistor T2 are connected through a common bias resistor R1 to the line 12. A diode D1 is connected behind the emitter of the transistor T2. A resistor R2, the resistance value of which lies in the Megohm range, is connected to the collector of the transistor T2, which forms the output of the oscillator circuit. The resistor R2 is so dimensioned that on the switching of the transistor T2, no voltage step, but a steep voltage edge arises at the output. Two resistors R3 and R4 are connected in series at the emitter of the transistor T2. Coupled parallel to the resistors R3 and R4 is the collector-emitter path of a further transistor T3 with a resistor R5 in series. The resistance value of the resistors R3 and R4 is so set that the transistor T2 can be securely rendered non-conductive independently of component tolerances and temperature influences.

A filter capacitor C2, a voltage divider R6 and R7 and an amplifier stage with a transistor T4 are coupled to the collector of the transistor T2. The transistor T4 at the same time serves as an invertor stage for the signal. A resistor R8 and a load resistor R9 are coupled in series with the collector-emitter path of the transistor T4. Lying parallel to these is a series circuit of a resistor R10 and a capacitor C3.

A two-stage delay circuit comprising capacitors C4 and C5 and resistors R11 and R12 is connected parallel to the load resistor R9. The emitter-base path of a regulating transistor T5 is arranged parallel to the capacitor C5 and its collector is connected through a resistor R13 to the base of the transistor T3, the collector-emitter path of which is connected in parallel with a capacitor C6 for shunting the high-frequency voltage. Diodes D2 and D3 with the load resistor R9 form a discharge circuit for the capacitors C4 and C5.

Coupled between the capacitor C3 and the resistor R10 is the base of a three-stage amplifier circuit consisting of the transistors T6, T7 and T8 and the resistors R14, R15 and R16. In case the steepness of the signal edge is not sufficiently high at the output of the oscillator circuit, an operational amplifier, the difference voltage inputs of which are coupled to the poles of the resistor R10, may be used in place of the three-stage amplifier circuit.

Bias resistors R17 and R18 are connected between the line 12 and the load resistor R9. Connected between resistors R17 and R18 is the base of of a transistor T9 which is arranged as a Zener diode for voltage limitation.

A further transistor T10, the base of which is coupled to a voltage divider comprising resistors R19 and R20, serves as a voltage stabilization circuit for the oscillator circuit 5, the regulating circuit 13 and the evaluating circuit 14.

The circuit according to FIG. 7 is substantially the same as that shown in FIG. 6. A bias resistor R21 is connected in front of the base of the transistor T1 and a bias resistor R22 is connected in front of the base of the transistor T1 and a bias resistor R22 is connected in front of the base of the transistor T2. The resistors R21 and R22 are connected through a parallel circuit of a resistor R23 and a capacitor C7 to the supply line. In order that the resistor R21 is not bridged over with respect to the direct current by the feed back winding L2, a capacitor C8 is connected in series with this. In place of the three-stage transistor circuit T6, T7 and T8, an operational amplifier OP is provided. A resistor R30 is connected parallel to the capacitor C3.

The operation of the described circuits is substantially the following:

The sensor 3 is operationally ready when an osciallatory field has built up around the air-cored coil or the ferrite rod 4. The frequency is determined by the capacitor C1 and the oscillator winding L1. The transistor T1 maintains the oscillation. Induced in the feedback winding L2 is a voltage, which is so great that the transistor T2 in FIG. 6 conducts or, respectively, in FIG. 7 is rendered non-conductive; the negative half-wave of the induced voltage may in that case be left out of consideration. The transistor T4 is blocked and practically no voltage drop occurs across the load resistor R9. The capacitors C4 and C5 are discharged through the diodes D2 and D3 or the resistor R9, respectively. The emittr-base voltage at the transistor T5 is so small that this is blocked. Thus, also the transistor T3 is blocked. The resistance value at the emitter of the transistor T1 is, in this case, determined solely by the resistors R3 and R4, and this in turn determines the amplitude of the oscillation.

When a metal article comes into the field of the ferrite rod or the air-cored coil, the amplitude of the oscillation is reduced by reason of the eddy currents induced in the metal. Correspondingly, also the voltage induced in the feedback winding L2 is reduced, so that the transistor T2 in FIG. 6 is rendered non-conductive or, respectively, in FIG. 7 is rendered conductive. The transistor T4 becomes more or less conductive according to the strength of the disturbance in the field. Correspondingly, a voltage drop is produced across the load resistor R9. This has the consequence that a charging current flows to the capacitor C3 through the resistor R10. As soon as the forward voltage of the transistor T6 has been exceeded at the capacitor C3 in FIG. 6, this and the transistor T7 as well as the transistor T8 switch through. Thereby, a current is drawn through the resistor R16 from the line 12. This current flow is utilized as described hereinafter for the control of the indicating unit 6.

In FIG. 7, the difference voltage inputs of the operational amplifier OP is coupled parallel to the resistor R10. This switches through during the charging of the capacitor C3 and thereby also draws a current from the line 12 during this period. The circuit is very sensitive also when the waveform of the output voltage of the transistor T2 is less steep.

At the same time, a change of charge of the capacitor C4 through the resistor R11 sets in with a delay corresponding to the time constant. Accordingly, also the charge on the capacitor C5 changes, delayed once again by the further time constant, through the resistor R12. As soon as the voltage decaying at the capacitor C5, for example after a few seconds, exceeds the forward voltage of the transistor T5, this becomes conductive, whereby the transistor T3 also becomes conductive. Thus, the resistance value effective at the emitter of the transistor T1 is reduced so that the amplitude of oscillation is correspondingly increased. It increases so far until the transistor T2 is again blocked so that the initially described circuit state is again attained.

The influence of the disturbance of the field by the metal article is compensated by increasing the amplitude of oscillation. The sensor unit can respond anew on a further disturbance, which may be due to either a movement of the metal article or to the introduction of a further metal article into the field.

Altogether, the circuit operates dynamically in such a manner as to indicate a relative motion between the sensor unit and a metal article and to stabilize the disturbance due to the metal article after a short delay time so that the circuit is automatically reset to optimum sensitivity. Accordingly, the usually metallic fender bar, to which the sensor unit may be mounted, can not impair the operation of the circuit, since this field disturbance is regulated out at once after the initial circuit operation. The circuit displays a wide regulating range and a high response sensitivity so that subsequent adjustments are redundant. In particular, component tolerances and temperature influences need not be regulated out.

Figure 8:
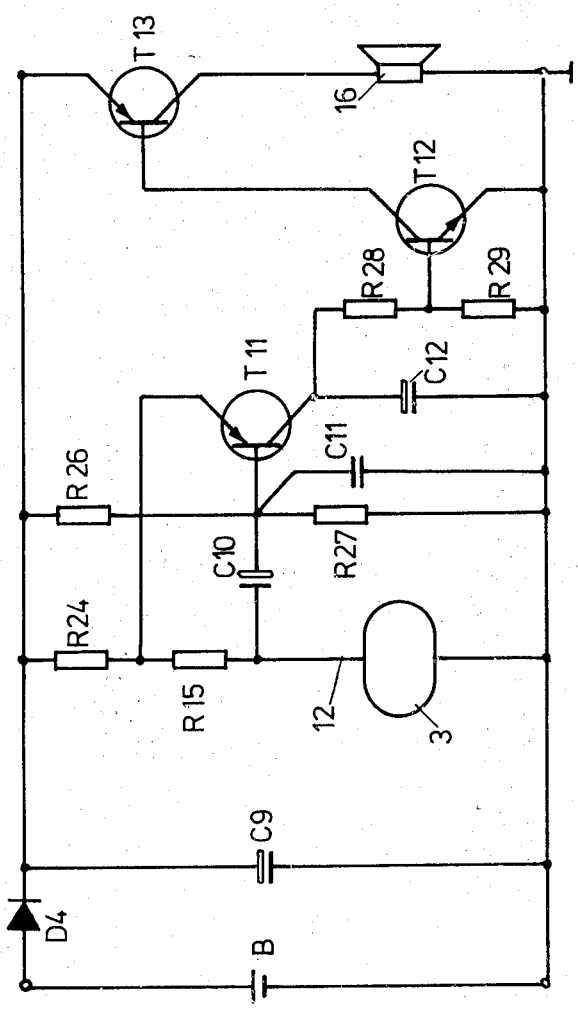
FIG. 8 shows the circuit arrangement of an indicating unit.

The indicating unit 6 illustrated in FIG. 8 is connected with the battery of the motor vehicle through a diode D4 which serves as protection against a wrong polarity. A filter capacitor C9 is connected behind the diode D4. The parallel arrangement of the sensor units 3 is connected through the line 12 in series with the bias resistors R24 and R15. A series circuit comprising a capacitor C10 and the base-emitter path of a transistor T11 is connected in parallel with the resistor R15. The transistor T11 receives a base bias voltage through a voltage divider of resistors R26 and R27. A capacitor C11 is also connected to the base of the transistor T11. An amplifier circuit comprising a capacitor C12, resistors R28 and R29 and transistors T12 and T13 is connected behind the collector of the transistor T11. A buzzer 16 is connected to the collector of the transistor T13. This circuit is so designed that it can be used selectably for any one of, for example, eight sensor units connected in parallel.

In operation, on the starting of the vehicle, the voltage of the battery, the nominal voltage of which amounts to 12 volts, rises to 14 volts. This excess voltage causes a current flow through the transistors T9 of each of the sensor units. The voltage drop arising across the resistor R15 causes a brief switching-on of the transistor T11, which has results in a response by the buzzer 16. This signal does not sound when the line 12 is interrupted at any place. The signal also does not sound when a short-circuit is present, for which the line 12 is applied to ground at any place, since the current flowing in this case through the line 12 is so great that the voltage increase by about 2 volts taking place during starting does not suffice for the switching of the transistor T11. A functional check is thus given.

When one of the described sensor units responds, then a current of for example 14 milliamps is drawn through the transistor T8 of the responsive sensor unit or the operational amplifier OP, as the case may be. This results in a voltage drop across the resistor R15, which through the capacitor C10 switches the transistor T11 to be conductive so that a signal is delivered by the buzzer 16. This is an indication to the driver that he has, for example, during parking, approached another vehicle to within about 30 centimeters.

The capacitor C10 is provided so that, when for example eight sensor units are connected in, the transistor T11 switches through only when one of the sensor units in fact draws current. The summated rest currents, for example 2 milliamps for each sensor unit, do not cause to the switching of the transistor T11. In place of the capacitor C10, a resistor can also be used when the number of the sensor units to be connected in parallel is known in advance. In this case, the circuit is so designed that when only a spacing of three to five centimeters exists between the vehicles, the regulating range of the circuit according to FIGS. 6 and 7 is exceeded causing a permanent signal to be delivered by the buzzer 16.

The resistor R24 reduces changes in the sensitivity of the response of the transistor T11 when the circuit is to be used with the same dimensioning for one or more of the sensor units.

The duration of the signal delivered by the buzzer 16 is dependent on the dimensioning of the charging circuits associated with the capacitors C3, C4, C5 and C10. These are so dimensioned that the signal duration depends on the charging processes of the capacitors C4 and C5.

The line 12 may additionally be connected to a further circuit, which substantially corresponds to the circuit shown in FIG. 8. This additional circuit displays no buzzer, but is connected through a relay with the signal horn of the motor vehicle. This circuit is switched on only when the ignition is switched off.

Thus, when another vehicle approaches the parked vehicle provided with the sensor units, the signal horn delivers a warning tone.

To detect whether the sensor units arranged at the rearward fender bar or those arranged at the forward fender bar have approached a vehicle, the line 12 of the forward sensor units and the line 12 of the rearward sensor units can each be connected to a respective indicating unit whose signals should then be different from each other.

A subsequent extension of the equipment to several sensor units is easily possible, since the indicating unit is designed from the start for several sensor units and the wiring is simple. On an enlargement, only the lines 12 of the sensor units needs to be connected at one end of the vehicle, the ground terminal being provided by the fastending.

To avoid the fields of the sensor units from mutually interfering, it is possible to arrange that these fields operate with different frequencies. This result may also be achieved by appropriately dimensioning the capacitors C1. The frequency of the resonant loop L1 and C1 is of the order of magnitude of 150 kilohertz. Deviations of about 20% serve to avoid mutual interference.

When it is desired to construct the circuit of the sensor unit 5 in the form of an integrated circuit, then the described components are adapted to the technology of the integrated circuits. External connections can then be made to particularly the resonant loop L1 and C1, the feedback coil L2, the resistors R2 and R4 and the capacitors.

When several sensor units are used on one fender bar, resonant loops may be connected to one single oscillator circuit to save expenditure on further circuits, regulating circuits and evaluating circuits.

I claim:

1. Apparatus mounted on a vehicle and arranged to provide a signal indicative of the spacing between the vehicle and a metal article being less than a predetermined amount, said predetermined amount being small compared with the length of the vehicle, the apparatus in combination with said vehicle comprising sensor units mounted to at least one fender and comprising at least one sensor unit mounted to a respective end portion of said at least one fender, of said vehicle, said sensor units being arranged in parallel with each other and each comprising:
   (a) a coil;
   (b) oscillator circuit means coupled to said coil and arranged in combination with said coil to generate a respective stray electromagnetic field, and to provide an output signal in response to any disturbance of said electromagnetic field as a result of the spacing between said vehicle and said metal article being less than said predetermined amount;
   (c) regulating circuit means arranged to receive said output signal and to compensate the disturbance of said electromagnetic field after a predetermined delay in response to said output signal, and
   (d) evaluating circuit means arranged to receive said output signal provided by said oscillator circuit means;
said apparatus further comprising spacing indicating circuit means mounted internally of the vehicle, and a single conductor line and earth return means electrically connecting said parallel arrangement of said sensor units to the indicating circuit means, the evaluating circuit means of each one of said sensor units being arranged in response to the respective output signal to cause a change in current in said single conductor line.

2. Apparatus as defined in claim 1, wherein each of said sensor units comprises a first and a second terminal, said first terminal of each of said sensor units being connected to said indicating circuit means by means of said single conductor line, the apparatus further comprising a source of ground potential, and fastening means connecting said second terminal of each of said sensor units to said source of ground potential thereby to form said earth return means.

3. Apparatus as defined in claim 2, wherein each of said sensor units comprises stabilizing circuit means arranged to stabilize the voltage of the oscillator, regulating and evaluating circuit means.

4. Apparatus as defined in claim 1, wherein said oscillator circuit means comprise a first transistor having an emitter and a second transistor having a collector and an output terminal to provide said output signal, adjustable resistor means coupled to said emitter of said first transistor, and inductor means arranged to control the conductive state of said second transistor.

5. Apparatus as defined in claim 4, wherein said evaluating circuit means comprise a load resistor, amplifying circuit means arranged to supply said output signal to said load resistor to control the voltage drop across said load resistor, said regulating circuit means being arranged in response to any change in the voltage drop across said load resistor to adjust the value of said adjustable resistor means.

6. Apparatus as defined in claim 5, wherein said adjustable resistor means comprise first and second resistor means connectable in parallel, said first resistor means being arranged to set the resistance value of said adjustable resistor means to a maximum, and said second resistor means when connected in parallel with said first resistor means under the control of said regulating circuit means being arranged to set the resistance value of said adjustable resistor means to a minimum.

7. Apparatus as defined in claim 6, wherein said regulating circuit means comprise a regulating transistor connected to said adjustable resistor means, and a two-stage RC network connected between said load resistor and said regulating transistor.

8. Apparatus as defined in claim 7, wherein said evaluating circuit means comprise an amplifier circuit, and an RC network comprising a resistor and a capacitor, said amplifier circuit being connected to said resistor of said RC-network of said evaluating circuit means, which RC-network is connected in parallel to said load resistor.

9. Apparatus as defined in claim 4, wherein said oscillator circuit means comprise a resistor connected to said collector of said second transistor, said output signal having a steepness of edge which is regulatable by said resistor.

10. Apparatus as defined in claim 9, wherein said amplifying circuit means comprise a switching transistor.

11. Apparatus as defined in claim 1, wherein said indicating circuit means comprise at least one bias resistor connected in series with said parallel arrangement of said sensor units, a capacitor connected to the at least one bias resistor, and a transistor connected to said capacitor.

12. Apparatus as defined in claim 1, wherein said indicating circuit means comprise a further circuit connecting said sensor units to a signal horn of the vehicle.

13. Apparatus as defined in claim 1, comprising a housing containing said sensor units, and an angle member extending over the entire length of said housing and fastening said sensor units to the at least one fender at a spacing therefrom.

14. Apparatus as defined in claim 1, wherein said oscillator circuit means is arranged to provide different oscillation frequencies for respective ones of said sensor units.

* * * * *